(12) United States Patent
Lakaniemi et al.

(10) Patent No.: US 7,983,309 B2
(45) Date of Patent: Jul. 19, 2011

(54) BUFFERING TIME DETERMINATION

(75) Inventors: Ari Lakaniemi, Helsinki (FI); Pasi Ojala, Kirkkonummi (FI)

(73) Assignee: Nokia Corporation, Espoo (FI)

( * ) Notice: Subject to any disclaimer, the term of this patent is extended or adjusted under 35 U.S.C. 154(b) by 522 days.

(21) Appl. No.: 11/624,836

(22) Filed: Jan. 19, 2007

(65) Prior Publication Data

US 2008/0175276 A1    Jul. 24, 2008

(51) Int. Cl.
*H04J 3/06*    (2006.01)

(52) U.S. Cl. .......................................... 370/516

(58) Field of Classification Search .................. None
See application file for complete search history.

(56) References Cited

U.S. PATENT DOCUMENTS

| | | | | |
|---|---|---|---|---|
| 6,504,838 | B1 * | 1/2003 | Kwan | 370/352 |
| 2002/0110137 | A1 * | 8/2002 | Nie | 370/429 |
| 2004/0057445 | A1 * | 3/2004 | LeBlanc | 370/412 |
| 2006/0056383 | A1 | 3/2006 | Black et al. | |

FOREIGN PATENT DOCUMENTS

| | | |
|---|---|---|
| EP | 1 278 353 | 1/2003 |
| WO | 03/021830 | 3/2003 |
| WO | 2006/044696 | 1/2007 |
| WO | 2007/091204 | 8/2007 |

OTHER PUBLICATIONS

3GPP TS 26.114 V1.2.0 (Dec. 13, 2006) "3rd Generation Partnership Project; Technical Specification Group Services and System Aspects IP Multimedia Subsystem (IMS); Multimedia Telephony; Media handling and interaction (Release 7)" TSG-SA4 internal working draft.

International Application No. PCT/EP2008/050183, Form PCT/ISA/220 (2 pages) dated Apr. 10, 2008 with Form PCT/ISA/210 (4 sheets) and Form PCT/ISA/237 (7 pages) Transmitting International Search Report and Written Opinion of the International Searching Authority (EPO).

"Design and analysis of optimal adaptive de-jitter buffers" by Gagan L. Choudhury et al; Computer Communications, Elsevier Science Publishers BV, Amsterdam, NL, vol. 27, No. 6, Apr. 2004, pp. 529-537, XP004496605.

"$3^{rd}$ Generation Partnership Project; Technical Specification Group Services and System Aspects IP Multimedia Subsystem (IMS); Multimedia Telephony; Media handling and interaction (Release 7) TSG-SA4 internal working draft" 3GPP TS 26.114 V1.2.0 (Dec. 13, 2006), pp. 1-77, XP002474320.

* cited by examiner

*Primary Examiner* — Chirag G Shah
*Assistant Examiner* — Otis L Thompson, Jr.

(57) ABSTRACT

This invention relates to methods, a computer program product and apparatuses in the context of frame buffering. A buffering time for one or more frames received by a frame buffer is determined based on a specific buffering time associated with a specific frame and on information representative of a specific amount of data stored in the frame buffer.

19 Claims, 6 Drawing Sheets

BUFFERING TIME DETERMINATION

FIELD OF THE INVENTION

This invention relates to buffering of frames, and in particular to determining a buffering time for one or more frames received by a frame buffer.

BACKGROUND OF THE INVENTION

Frame buffers are inter alia deployed in the context of video and audio processing, such as for instance in Voice over IP (VoIP) systems.

In general, network jitter and packet loss conditions can cause degradation in quality for example in conversational speech services in packet switched networks, such as the Internet. The nature of the packet switched communications can introduce variations in transmission of times of the packets (containing frames), known as jitter, which can be seen by the receiver as packets arriving at irregular intervals. However, an audio playback device requires constant input to maintain good audio quality, and no interruptions can be allowed. Thus, if some packets/frames arrive at the receiver after they are required for playback, the decoder may have to consider those frames as lost and perform error concealment.

Typically, a fixed buffer to manage network jitter can be utilised to store incoming frames for a predetermined amount of time (specified e.g. upon reception of the first packet of a stream) to hide the irregular arrival times and provide constant input to the decoder and playback components.

This approach is illustrated in FIG. 1, which shows timelines of a transmitter TX, a receiver RX and a decoder DEC, respectively. On the uppermost timeline, the regularly spaced transmission points of time of frames are illustrated by vertical lines. Similarly, in the middle timeline, the reception points of time of the transmitted frames are illustrated by vertical lines, wherein the reception points of time, for instance due to network jitter, are irregularly spaced. Finally, the lowermost timeline shows the decoding points of time of the frames, which are, due to the fact that the decoder DEC needs to provide constant input to the playback device, regularly spaced. Therein, the relationship between transmission, reception and decoding points of time of the same frame is illustrated by means of dashed arrows. As can be seen by comparing the reception point of time of the first received frame in the middle timeline with its associated decoding point of time in the lowermost timeline, the jitter buffer introduces an additional delay increasing the end-to-end delay since the received frames are stored in the jitter buffer before the decoding process.

A shortcoming of this basic approach is that a jitter buffer management scheme requiring fixed playback timing is inevitably a compromise between low enough buffering delay and low enough number of delayed frames, and finding an optimal trade-off can be a difficult task. For example, in the situation shown in FIG. 1, the frame sent at 100 ms arrives at the receiver RX after it is needed for further processing by decoder DEC, and therefore it needs to be replaced with error concealment (i.e. a "late loss" occurs, shown as a dashed vertical line).

There may exist special environments and applications where the amount of expected jitter can be estimated to remain between predetermined limits. In general, however, the network delay associated with jitter can vary from a scintilla of time to hundreds of milliseconds within the same session. Using a jitter buffer management scheme requiring fixed playback timing with an initial buffering delay set to a large enough value to cover the jitter, according to an expected worst case scenario, would keep the number of delayed packets in control. However, at the same time there may arise a risk of introducing an end-to-end delay which can be too long to enable a natural conversation. In this case applying a fixed jitter buffer management scheme may not be a practical choice in most audio transmission applications operating over a packet switched network, e.g. in VoIP over the 3GPP IP Multimedia Subsystem (IMS).

In contrast to a fixed jitter buffer management scheme, an adaptive jitter buffer management scheme can be used to dynamically control the balance between short enough delay and low enough number of delayed frames. In this approach, an entity controlling the jitter buffer constantly monitors the incoming packet stream and adjusts the buffering delay (or buffering time, these terms are used interchangeably) according to observed changes in the network delay behaviour. If the transmission delay seems to increase or the jitter becomes worse, the buffering delay may need to be increased to meet the network conditions. In the opposite situation, where the transmission delay seems to decrease, the buffering delay can be reduced, and hence, the overall end-to-end delay can be minimised.

One of the challenges in adaptive jitter buffer management is reliable estimation—or actually prediction—of the transmission characteristics. Although adaptation based on the reception statistics of most recent packets usually gives a reasonable estimate on the short-term network behaviour, it may be impossible to avoid the fact that some frames arrive after their scheduled decoding time—i.e. too late for normal decoding, especially when applying relatively strict buffering delay requirement.

Jitter buffer adaptation during active speech requires additional processing to shorten or extend the speech signal (i.e. time scaling, also known as time warping) to maintain good voice quality and intelligibility. For example, suitable methods are disclosed in documents WO 03/021830 and U.S. 2006/0056383. To avoid complex time scaling, a commonly used method for jitter buffer management is to perform the adaptation during comfort noise signal periods typically at beginning of a new talk spurt (i.e. at a speech onset). This approach can be expected to provide low complexity adaptation functionality with high quality, since the comfort noise signal does not carry information that is important for intelligibility or actual voice quality. The minor drawback of the onset adaptive jitter buffer management is that even though the network analyser detects changes in the delay characteristics, the jitter buffer adaptation needs to wait for the next speech onset to take place. However, jitter buffer management solutions apply the onset adaptive approach as part of the adaptation functionality. Where the basic approach is to re-estimate the required buffering time and perform adaptation at each speech onset, while only urgent adaptation steps are taken during active speech.

A basic (adaptive) jitter buffer management approach uses the statistics on the current number of frames in the buffer as an indication of the buffer status. If, for example, the number of frames in the buffer falls below a predetermined (or adaptively determined) threshold, an adaptation step to increase the buffering time can be initiated to take place at the next speech onset in order to decrease the risk of subsequent frames arriving too late. If, however, the number of frames in the buffer grows above another predetermined (or adaptively determined) threshold, an adaptation step to decrease the buffering time can be initiated to reduce delay for improved interactivity.

An alternative approach may use statistics computed over several frames instead of considering only single frames. For instance, the number of instances when the number of frames in the buffer falls below or above predetermined limits over an analysis window consisting of several frames (or time corresponding to several frames' duration) may be counted. Equally well, the average number of frames in the buffer may be considered over an analysis window as the indication of buffer status which is used for controlling the jitter buffer management operation.

When considering the buffer status indication based on the number of frames, one possible way to apply adaptation is to estimate the target buffer level as a number of frames, and then to wait for the selected number of frames to arrive and accumulate in the buffer before decoding (or playing back) the first frame of a talk spurt at the point a speech onset is detected.

This is illustrated in FIG. 2, wherein the structure of FIG. 2. In this example, the speech onset frame is the one transmitted at 20 ms (and received approximately at 36 ms), and the decoding & playback is started after three frames (the first one to be decoded plus two other ones providing assumed 40 ms of jitter protection) have arrived at the buffer. In this example this approach would result in approximately 52 ms buffering delay for the first frame of the talk spurt.

A considerably different jitter buffer management approach is to indicate the buffer status based on the buffering time. The buffering time may for instance be an observed buffering time recorded when a frame is passed to the decoder (or playback device), or a predicted buffering time computed when a frame is received. Methods for predicting a buffering time are for instance disclosed in document WO 2006/044696. As in the aforementioned approaches, which are based on the number of frames stored in the buffer, the buffer adaptation approach based on the buffering time may also consider statistics computed over several frames instead of keeping track of single frames only.

Jitter buffer management based on the buffering time may for instance be performed by estimating the required buffering time (e.g. in milliseconds), and applying this buffering time for the first frame of a talk spurt when a speech onset is encountered.

The example in FIG. 3 illustrates this approach. In this case, the estimated buffering delay of 40 ms is applied for the first frame of the talk spurt simply by directly delaying its decoding & playback by 40 ms.

The previously described jitter buffer management approaches for speech onset handling can be expected to provide, on average, approximately equal performance (both in terms of delay and late-loss). However, there can be special cases where these approaches may fail, either by introducing unnecessarily high buffering delay until the next adaptation step, or by providing inadequate jitter protection, leading to an unnecessarily high rate of late-loss frames.

For instance, problematic cases for jitter buffer management based on the number of frames in the buffer are scenarios where the frame triggering the start of the decoding & playback is an "outlier"—i.e. it arrives too early or too late (with respect to the subsequent frames). In the former case, which is illustrated in FIG. 4, buffer adaptation may provide too short buffering time causing high late-loss rate, while in the latter case, which is illustrated in FIG. 5, the buffering time would be unnecessarily high (and there may be also a risk of buffer overflow) until the next adaptation point.

If the "trigger frame", denoting the frame triggering the start of the decoding and playback, is lost in the transmission path, the jitter buffer manager will wait until the next frame is successfully received before starting the decoding & playback. In case of a long lost burst this may obviously increase buffering time significantly.

On the other hand, for jitter buffer management based on the buffering time, the critical frame is the actual speech onset frame: if it arrives "early", the buffering time may be too short (see FIG. 6), causing increased late-loss rate. If it arrives "late", the buffering time may become unnecessarily long (see FIG. 7).

SUMMARY

A method is disclosed, comprising determining a buffering time for one or more frames received by a frame buffer based on a specific buffering time associated with a specific frame and on information representative of a specific amount of data stored in the frame buffer.

Furthermore, a method is disclosed, comprising determining a buffering time for one or more speech frames received by a jitter buffer based on a specific buffering time associated with a specific speech frame and on information representative of a specific amount of data stored in the jitter buffer.

Furthermore, a computer-readable medium having a computer program stored thereon is disclosed. The computer program comprises instructions operable to cause a processor to determine a buffering time for one or more frames received by a frame buffer based on a specific buffering time associated with a specific frame and on information representative of a specific amount of data stored in the frame buffer. Therein, the computer-readable medium may be any medium that is capable of storing digital data in electric, magnetic, electromagnetic or optic form. The medium may be a fixedly installed or removable medium.

Furthermore, a computer program is disclosed, comprising instructions operable to cause a processor to determine a buffering time for one or more frames received by a frame buffer based on a specific buffering time associated with a specific frame and on information representative of a specific amount of data stored in the frame buffer.

Furthermore, an apparatus is disclosed, comprising a determining unit configured to determine a buffering time for one or more frames received by a frame buffer based on a specific buffering time associated with a specific frame and on information representative of a specific amount of data stored in the frame buffer.

Furthermore, an apparatus is disclosed, comprising an adaptation control unit configured to determine a buffering time for one or more speech frames received by a jitter buffer based on a specific buffering time associated with a specific speech frame and on information representative of a specific amount of data stored in the jitter buffer.

Finally, an apparatus is disclosed, comprising means for determining a buffering time for one or more frames received by a frame buffer based on a specific buffering time associated with a specific frame and on information representative of a specific amount of data stored in the frame buffer.

The above-disclosed apparatuses may be embodied as a module, respectively. This module may for instance be connected to a device that contains the frame buffer, in order to determine the buffering time for one or more frames received by the frame buffer. The apparatuses may equally well comprise the frame buffer itself. The apparatuses may for instance be receivers that receive, buffer and further process the frames. The apparatuses may for instance be Multimedia Telephony Service for Internet Protocol Multimedia Subsystem (MTSI) speech receivers or parts of such receivers.

According to the methods, computer program product, computer programs and apparatuses of the present invention, a buffering time for one or more frames received by a frame buffer is determined. The frames may for instance be received by the buffer in the form of packets, and the packets may be unpacked by the buffer to obtain the frames. The buffering time to be determined may for instance be defined as the time between the reception of a frame in the frame buffer and the output of this frame out of the frame buffer. The buffering time may for instance be determined for a single frame only, e.g. for the specific frame, or for several frames. The frames received by the frame buffer may have the same length or have different lengths. The determined buffering time may for instance be used to trigger reading of frames out of the frame buffer by a downstream processing unit, such as for instance a decoder.

The buffering time is determined based on a specific buffering time associated with a specific frame, and on information representative of a specific amount of data stored in the frame buffer. The specific frame may for instance be a reference frame, e.g. a frame marking or representing a start, an end or a change. The specific frame may for instance be an onset speech frame, which marks the beginning of a talk spurt. The buffer then buffers speech frames, for instance to compensate for jitter, and the buffering time for the one or more frames is then determined, inter alia, based on a specific buffering time of this onset speech frame.

The specific buffering time may for instance be an estimated required buffering time for the specific frame, or may define the time lapsed since the reception of the specific frame in the frame buffer until a current point of time.

The information representative of a specific amount of data stored in the frame buffer may refer to all data stored in the frame buffer, or to only a part thereof. The information representative of a specific amount of data stored in the frame buffer may for instance comprise a number of frames contained in the frame buffer, and/or a time span covered by a number of frames contained in the frame buffer to name but a few exemplary possibilities. The number of frames contained in the frame buffer may for instance relate to all frames currently contained in the frame buffer. This definition of the number of frames contained in the frame buffer may for instance be applied in scenarios where frames that have already been read from the frame buffer are also removed from the frame buffer. Equally well, the number of frames may relate only to those frames in the frame buffer that are subsequent (e.g. in processing order, for instance in decoding order) with respect to the specific frame (e.g. an onset frame), including or excluding the specific frame. Moreover, if the frame buffer is configured to buffer frames of different frame sequences, the number of frames may relate to only one of these frame sequences.

Considering the time span covered by a number of frames contained in the frame buffer may give more reliable information on the buffer status (than considering the number of frames contained in the frame buffer) in case some of the frames are lost in the transmission path. Consider an example: frames with frame numbers n, n+1 and n+3 are stored in the buffer. Considering a number of frames contained in the frame buffer as frame information may indicate the "buffer depth" to be three frames, whereas considering the time span covered by a number of frames contained in the frame buffer may take into account the fact that the frame with frame number n+2 is missing from the sequence, and that the frames in the buffer actually cover a time span of four frames.

According to the methods, computer program product, computer program and apparatuses of the present invention, thus a buffering time for one or more frames is determined under consideration of both i) specific buffering time information and ii) information representative of a specific amount of data stored in the frame buffer This approach may particularly contribute to improve the buffering performance in terms of lower late loss rate and/or shorter buffering delay, especially in challenging transmission conditions introducing large jitter and/or high numbers of lost packets.

According to an exemplary embodiment of the present invention, the information comprises a time span covered by a number of frames contained in the frame buffer.

In this exemplary embodiment of the present invention, the determining may comprise calculating an output point of time for the specific frame as the sum of a point of time at which the specific frame is received and the specific buffering time; and checking, under consideration of the time span covered by a number of frames contained in the frame buffer and the specific buffering time, if the specific frame shall be output at the output point of time or at another point of time. The buffering time is thus determined for the specific frame as the difference between the point of time at which the specific frame is received and the point of time at which the specific frame is output.

In this exemplary embodiment of the present invention, the specific buffering time may be a required buffering time of the specific frame. The required buffering time may for instance be estimated.

In this exemplary embodiment of the present invention, the checking may comprise checking, if the output point of time has elapsed; checking, in case the output point of time has elapsed, if the time span is smaller than a first value that at least partially depends on the specific buffering time, increasing the output point of time and returning to the checking if the output point of time has elapsed in case the time span is smaller than the first value, and determining that the specific frame shall be output at a current point of time in case the time span is not smaller than the second value; and checking, in case the output point of time has not yet elapsed, if the time span is larger than a second value that at least partially depends on the specific buffering time, determining that the specific frame shall be output at a current point of time in case the time span is larger than the second value, and returning to the checking if the output point of time has elapsed in case the time span is not larger than the second value. Therein, the output point of time may for instance be increased by a constant or an adaptively determined value. This value may for instance be decreased at or after each time when an increasing of the output point of time is performed.

Therein, the first value may be the specific buffering time minus a first margin value. The second value may be a specific buffering time plus a second margin value. The first and/or second margin values may for instance be constant or be adaptively determined.

According to a further exemplary embodiment of the present invention, the information comprises a number of frames contained in the frame buffer.

In this exemplary embodiment of the present invention, the determining may comprise determining a target number of frames; and checking, under consideration of a time duration derived from the number of frames contained in the frame buffer and the specific buffering time, if the specific frame shall be output at a point of time at which a number of frames in the frame buffer has reached the target number of frames or at another point of time.

In this exemplary embodiment of the present invention, the specific buffering time may be a time elapsed since the specific frame has been received.

In this exemplary embodiment of the present invention, the checking may comprise checking, if a number of frames in the frame buffer has reached the target number of frames; checking, in case the number of frames in the frame buffer has reached the target number of frames, if a time duration derived from the number of frames contained in the frame buffer is larger than a third value that at least partially depends on the specific buffering time, increasing the target number of frames and returning to the checking if a number of frames in the frame buffer has reached the target number of frames in case the time duration is larger than the third value, and determining that the specific frame shall be output at a current point of time in case the time duration is not larger than the third value; and checking, in case the number of frames in the frame buffer has not yet reached the target number of frames, if the time duration is smaller than a fourth value that at least partially depends on the specific buffering time, determining that the specific frame shall be output at a current point of time in case the time duration is smaller than the fourth value, and returning to the checking if a number of frames in the frame buffer has reached the target number of frames in case the time duration is not smaller than the fourth value.

Therein, the third value may be the specific buffering time plus a third margin value. The fourth value may be the specific buffering time minus a fourth margin value. The third and/or fourth margin values may for instance be constant or be adaptively determined.

According to a further exemplary embodiment of the present invention, the determining of the buffering time for one or more frames is performed in a multimedia telephony service for internet protocol multimedia subsystem speech receiver. Equally well, the determining may be performed in any other type of speech receiver or in any other type of receiver that deploys a buffer.

These and other aspects of the invention will be apparent from and elucidated with reference to the detailed description presented hereinafter. The features of the present invention and of its exemplary embodiments as presented above are understood to be disclosed also in all possible combinations with each other.

DETAILED DESCRIPTION OF THE INVENTION

In the following detailed description of the present invention, exemplary embodiments of the present invention will be described in the context of a speech coding system. It should be noted that the present invention is however not restricted to speech coding systems, but is equally well applicable in all other types of systems where frames are buffered.

Figure 8:
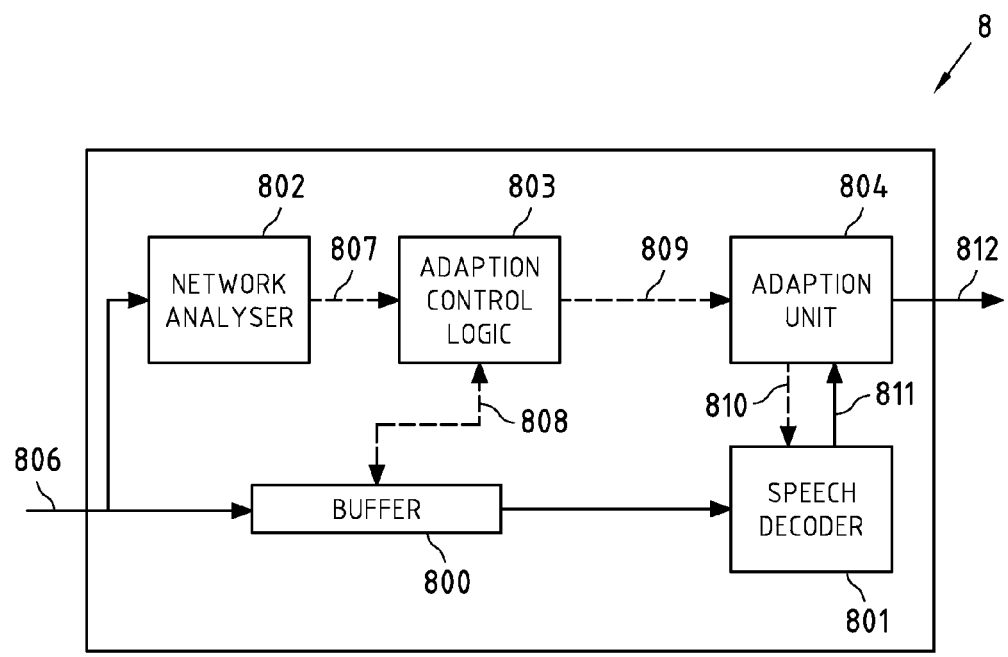
FIG. 8: a schematic block diagram of an exemplary embodiment of an apparatus according to the present invention.

FIG. 8 is a schematic block diagram of an exemplary embodiment of an apparatus 8 according to the present invention. Therein, transfer of content between the blocks is illustrated by means of solid lines, whereas the transfer of control information is illustrated in dashed lines. Apparatus 8 is exemplarily considered to be a speech receiver, for instance in the context of the Multimedia Telephony Service for Internet Protocol Multimedia Subsystem (MTSI).

Apparatus 8 comprises a jitter buffer 800, a speech decoder 801, a network analyzer 802, an adaptation control logic 803 and an adaptation unit 804.

Jitter buffer 800 is configured to at least temporarily store one or more speech frames, which are received via a (wired or wireless) network for instance in the form of packets 806. These packets 806 may for instance be Real-time Transport Protocol (RTP) packets, which are unpacked by buffer 800 to obtain the speech frames. Buffer 800 is linked to speech decoder 801 to output speech frames when they are requested for decoding.

Buffer status information 808, such as for instance information on a number of frames contained in buffer 800, or information on a time span covered by a number of frames contained in the buffer, or a buffering time of a specific frame (such as an onset frame), is transferred between buffer 800 and adaptation control logic 803.

Network analyzer 802 monitors the incoming packets 806, for instance to collect reception statistics (e.g. jitter, packet loss). Corresponding network analyzer information 807 is passed from network analyzer 802 to adaptation control logic 803.

Adaptation control logic 803, inter alia, controls buffer 800. This control comprises determining buffering times for one or more frames received by buffer 800, and is performed based on network analyzer information 807 and/or buffer status information 808. The steps performed by adaptation control logic 803 when determining buffering times will be explained in more detail with reference to the flowcharts of FIGS. 9 and 11 below. The buffering delay of buffer 800 may for instance be controlled during comfort noise periods, during active speech periods or in-between. For instance, a buffering time of an onset speech frame may be determined by adaptation control logic 803, and speech decoder 801 may (for instance via adaptation unit 804, signals 809 and 810) then be triggered to extract this onset speech frame from buffer 800 when this determined buffering time has elapsed.

Adaptation unit 804, if necessary, shortens or extends the output speech signal 812 according to requests given by adaptation control logic 803 to enable buffer delay adjustment in a transparent manner.

Speech decoder 801 extracts frames from buffer 800 for decoding and outputs the decoded speech 811 to adaptation unit 804. Speech decoder 801 may for instance be an Adaptive Multirate (AMR) or Adaptive Multirate Wideband (AMR-WB) speech decoder.

Figure 9:
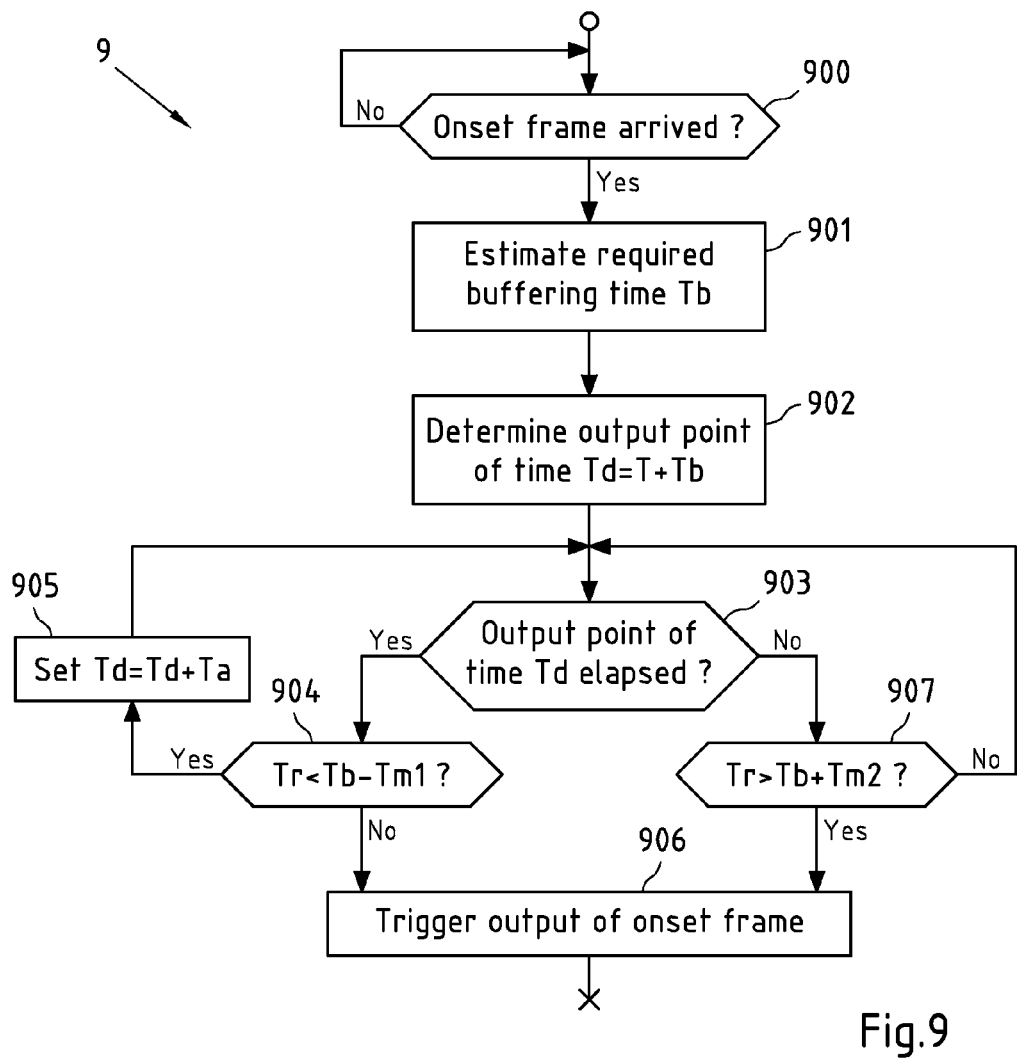
FIG. 9: a flowchart of a first exemplary embodiment of jitter buffer management according to the present invention.

FIG. 9 is a flowchart 9 of a first exemplary embodiment of jitter buffer management according to the present invention. The steps of this flowchart may for instance be performed by adaptation control logic 803 of FIG. 8 to determine a buffering time for an onset frame.

In a first step 900, it is checked if an onset frame has arrived at buffer 800. This may for instance be signaled to adaptation logic 803 in the form of buffer status information 808 (see FIG. 8). If an onset frame has arrived, a required buffering time Tb for the onset frame is estimated in a step 901. This may for instance be performed by adaptation control logic 803 based on network analyzer information 807 obtained from network analyzer 802 (see FIG. 8).

In a step 902, an output point of time Td is computed as the sum of the current point of time T and the estimated required buffering time Tb.

In a step 903, it is checked if the output point of time Td has elapsed. If this is the case, in a step 904, it is checked if the time span Tr covered by all frames contained in buffer 800 is smaller than the estimated required buffering time Tb minus a first margin value Tm1, which may be either constant or adaptive. Therein, it is assumed that frame buffer 800 only contains "new" frames, i.e. frames that are subsequent in decoding order with respect to the onset frame. This may imply that "old" frames that have already been decoded have been removed from frame buffer 800. If "old" frames are at least temporarily kept in frame buffer 800, the time span may for instance be considered to be related only to the onset frame and the frames that are subsequent in playback order with respect to the onset frame. The information on the time span or information required for computing the time span may for instance be signaled to the adaptation control logic in the form of buffer status information 808 (see FIG. 8). If the check in step 904 is positive, in a step 905, the output point of time Td is increased by a value Ta, which may either be constant or adaptively determined, and the flowchart jumps back to step 903. Therein, the value of Tm1 could for instance be adapted to a smaller value each time Td is increased. This may help avoiding excessive buffering delay in case of a long loss burst (if one keeps pushing Td forward in time, but no new frames come in to increase the value of Tr, one might end up adding more buffering delay until the first frame after a lost burst arrives).

If the check in step 904 is negative, the immediate output of the onset frame for decoding by speech decoder 801 (see FIG. 8) is triggered in a step 906. By triggering the output of the onset frame, also the buffering time of the onset frame is determined.

If the check if the output point of time Td has elapsed in step 903 is negative, it is checked in step 907 if the time span Tr covered by the frames contained in the buffer is larger than the estimated required buffering time Tb plus a second margin value Tm2, which may be either constant or adaptively determined. If the check in step 907 is negative, the flowchart jumps back to step 903. If the check in step 907 is positive, the immediate output of the onset frame for decoding by speech decoder 801 (see FIG. 8) is triggered in a step 906.

As can be seen from flowchart 9 of FIG. 9, according to this first exemplary embodiment of the present invention, the buffering time of the onset frame is determined under consideration of an estimated required buffering time Tb for the onset frame, and on the time span Tr covered by a number of frames contained in buffer 800 of FIG. 8. Instead of immediately triggering the output of the onset frame when the check in step 903 is positive, the flowchart 9 performs further checks that consider knowledge of the time span Tr.

The processing of the adaptation control logic 803 then takes the following shape: At the start of a talkspurt region, buffer 800 is populated with incoming packets/frames of speech data. When the decoder timeline reaches the determined output point of time Td (step 903), the jitter buffer management system notes how many frames are stored in buffer 800 and determines the time span covered by these speech frames. If the network has experienced delays, then buffer 800 will not be as full as it should be. In this case the time span covered by these speech frames may be less than the estimated required buffering time Tb minus some margin value Tm1 (step 904). The time line is pushed back by a value Ta (step 905), which effectively delays the decoding of the onset speech frame by this value. This then gives the opportunity for buffer 800 to fill up with further packets/frames from the network. This "loop" is continued until there are enough packets/frames of speech data that cover a time span that is large enough to satisfy the estimated required buffering time Tb. Using this technique may allow better control of underflows, which results in an improvement in speech quality for packet based systems.

Alternatively, in network conditions where frames arrive in bursts, the time span Tr occupied by the frames in buffer 800 may be greater than the estimated required buffering time Tb plus some margin Tm2 (step 907). The decoding will commence. This effectively pushes the timeline of the decoder forward to a point in time before the output point of time Td has been reached. Using this technique results in keeping the delay of the decoder time line to a minimum, thereby allowing the end to end speech communication delay to be as small a possible. Furthermore, the risk of buffer overflow is reduced.

Figure 6:
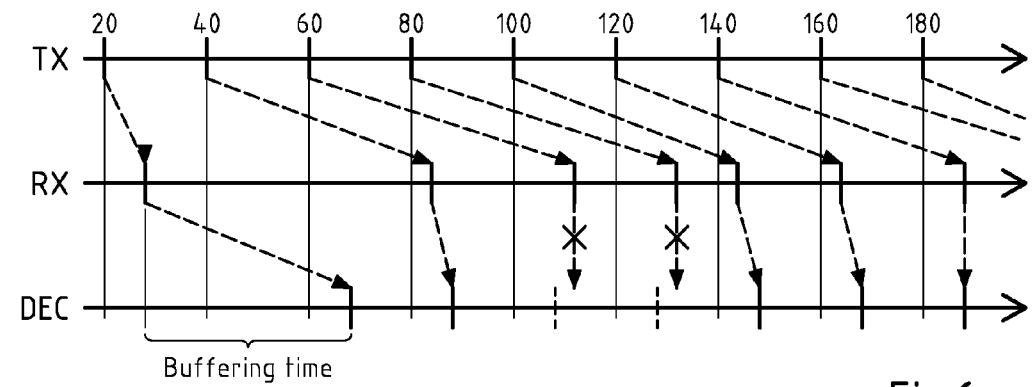
FIG. 6: an exemplary illustration of frame buffering according to a jitter buffer management scheme based on a buffering time in case of an early arriving onset frame.
Figure 7:
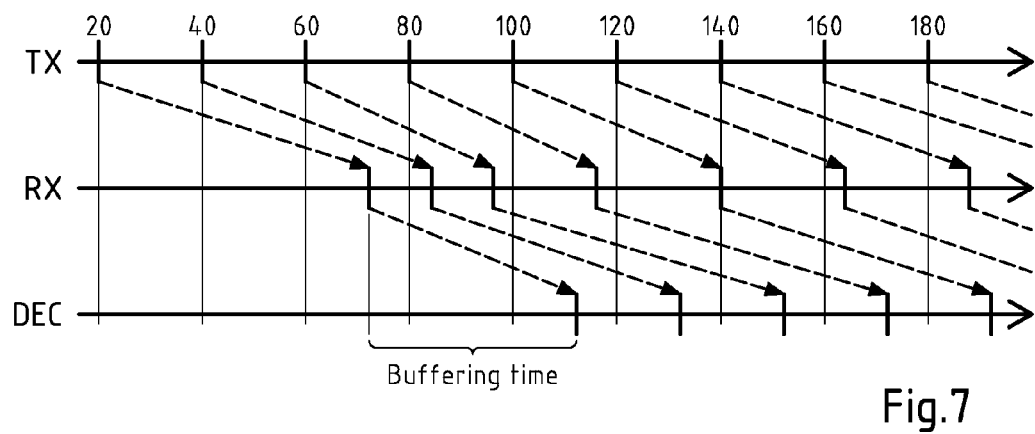
FIG. 7: an exemplary illustration of frame buffering according to a jitter buffer management scheme based on a buffering time in case of a late arriving onset frame.
Figure 10:
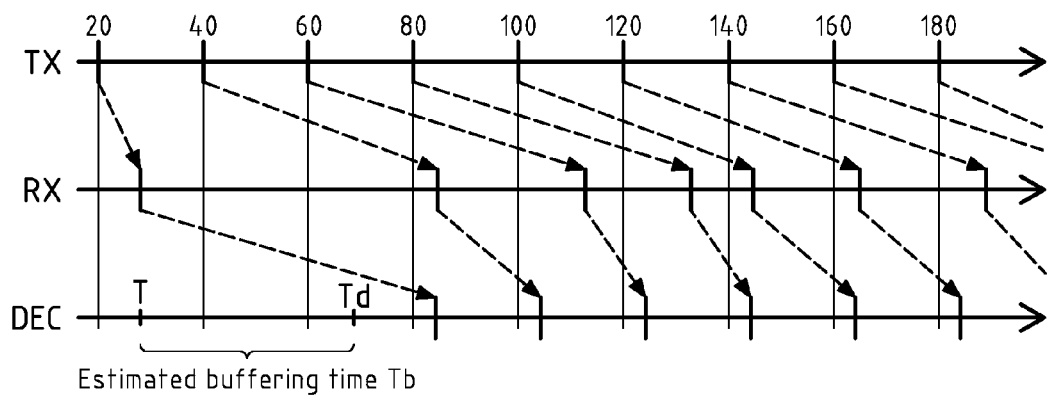
FIG. 10: an exemplary illustration of frame buffering according to the first exemplary embodiment of jitter buffer management according to the present invention in case of an early arriving onset frame.

FIG. 10 illustrates the enhancement that is achieved by the first exemplary embodiment of the present invention in case of an early arriving onset frame (compare to FIG. 6). As a result, instead of using the estimated required buffering time Tb for the onset speech frame, an increased buffering time is used, so that, compared to the jitter buffer management approach of FIG. 6, which only considers the estimated required buffering time Tb and not additionally the time span Tr, all frame losses can be avoided.

Figure 11:
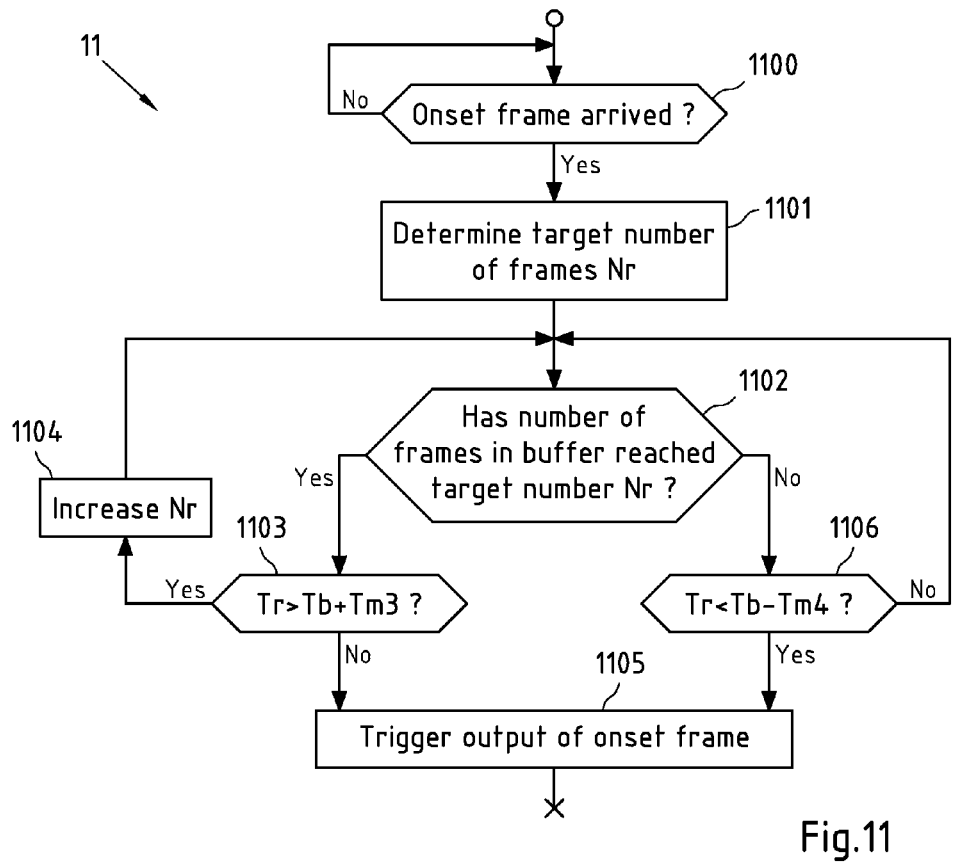
FIG. 11: a flowchart of a second exemplary embodiment of jitter buffer management according to the present invention.

FIG. 11 is a flowchart 11 of a second exemplary embodiment of jitter buffer management according to the present invention. The steps of this flowchart 11 may for instance be performed by adaptation control logic 803 of FIG. 8 to determine a buffering time for an onset frame.

In a first step 1100, it is checked if an onset speech frame has arrived at buffer 800 (see FIG. 8). If this is not the case, the flowchart jumps back to step 1100; otherwise, a target number of frames Nr is determined in a step 1101, for instance based on network analyzer information 802 received from network analyzer 802 (see FIG. 8). The target number of frames Nr implies Tr milliseconds of jitter protection (i.e. Tr=Nr*frame duration in milliseconds).

In a step 1102, it is then checked if the number of all frames contained in buffer 800 has reached the target number of frames Nr. Therein, it is assumed that frame buffer 800 only contains "new" frames, i.e. frames that are subsequent in decoding order with respect to the onset frame. This may imply that "old" frames that have already been decoded have been removed from frame buffer 800. If "old" frames are at least temporarily kept in frame buffer 800, the time span may for instance be considered to be related only to the onset frame and the frames that are subsequent in playback order with respect to the onset frame.

If the check in step 1102 is positive, it is checked in a step 1103, if Tr is larger than a value Tb plus a third margin value Tm3, which may either be constant or adaptively determined. Therein, value Tb is the time elapsed since the reception of the onset frame in buffer 800. It should be noted that value Tb represents a buffering time, but, with respect to the value Tb used in the first exemplary embodiment has a different meaning.

If the check in step 1103 is positive, the target number of frames Nr is increased in a step 1104, for instance by one frame, and the flowchart jumps back to step 1102. Otherwise, the immediate output of the onset frame for decoding by speech decoder 801 (see FIG. 8) is triggered in a step 1105. By triggering the output of the onset frame, also the buffering time of the onset frame is determined.

If the check in step 1102 is negative, it is checked in a step 1106 if the value Tr is smaller than the value Tb minus a fourth margin value Tm4. If this is not the case, the flowchart jumps back to step 1102. Otherwise, the immediate output of the onset frame for decoding by speech decoder 801 (see FIG. 8) is triggered in a step 1105.

As can be seen from flowchart 11 of FIG. 11, according to this second exemplary embodiment of the present invention, the buffering time of the onset frame is determined under consideration of information on a number of frames in buffer 800 and information on the buffering time Tb of the onset frame. Instead of immediately triggering the output of the onset frame when the check in step 1102 is positive, the flowchart 11 performs further checks that consider knowledge of the buffering time Tb of the onset frame.

The processing of the adaptation control logic 803 then takes the following shape: jitter buffer management sets out from a target number of frames Nr. This number has an equivalent time value Tr, which is the estimated buffer delay in time (based on the number of frames).

The value Tr is used to delay the decoder timeline. So in an ideal world where the speech frames arrive at regular intervals (e.g. 20 ms) from the network, the filling up rate of buffer 800 would be equal to the time which the decoder timeline has to be delayed, therefore in this case Tb=Tr.

However, if a burst of speech frames is received in buffer 800 at the start of talk spurt region, then buffer 800 will fill up at a faster rate than the required delay value Tr in the decoder time line. So in this case the buffering time needs to be increased to accommodate the extra frames arriving before the target delay Tr has been reached in the decoder timeline. The buffer size will increase by one frame. Note that the actual value of Tr is not updated when this test and calculation loop is performed. This methodology effectively allows the jitter buffer management to handle a burst in the number of packets delivered by the network.

Alternatively, the network may be delivering packets/frames at a slower rate at the beginning of a talk spurt region. In this case buffer 800 will be filling up (to the required buffer depth) at a slower rate than which the decoder timeline is advancing. In this case in order to avoid excessive jitter buffer delay, the decoder playback will commence as soon as Tb>Tr+Tm4.

Figure 1:
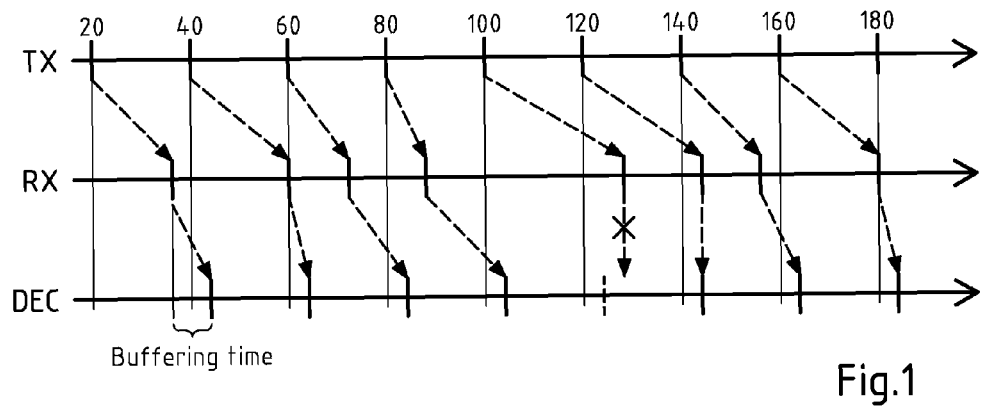
FIG. 1: An exemplary illustration of frame buffering according to a fixed jitter buffer management scheme.
Figure 2:
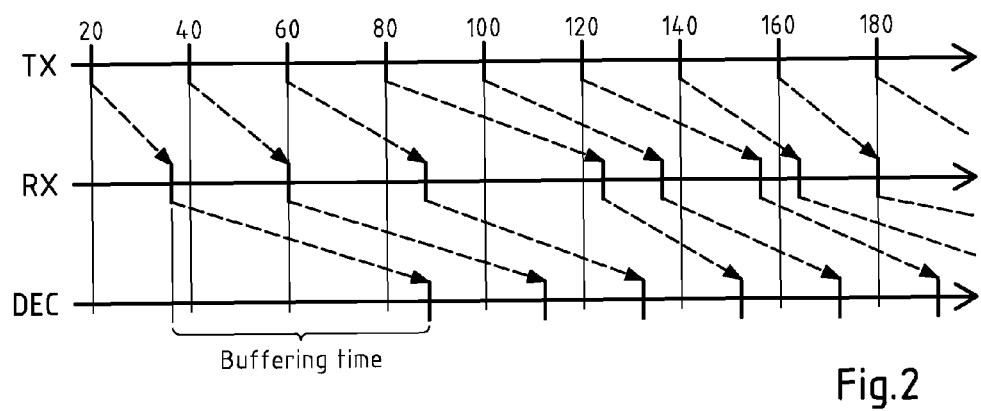
FIG. 2: an exemplary illustration of frame buffering according to a jitter buffer management scheme based on the number of frames in the buffer.
Figure 3:
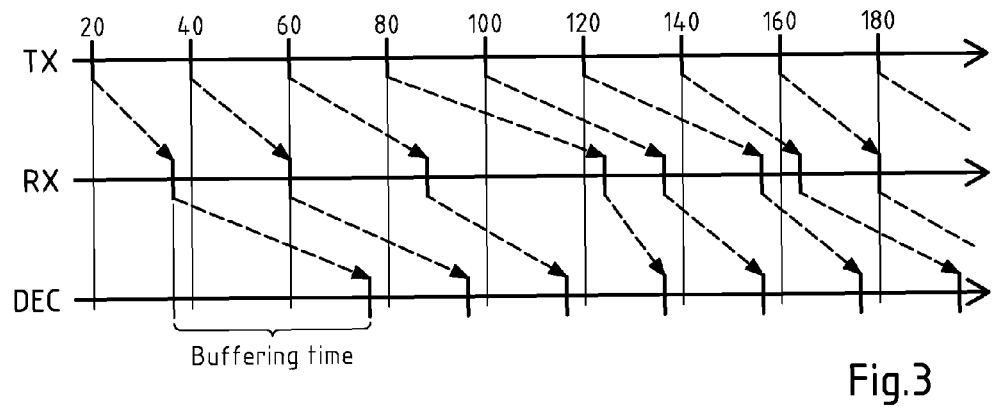
FIG. 3: an exemplary illustration of frame buffering according to a jitter buffer management scheme based on a buffering time.
Figure 4:
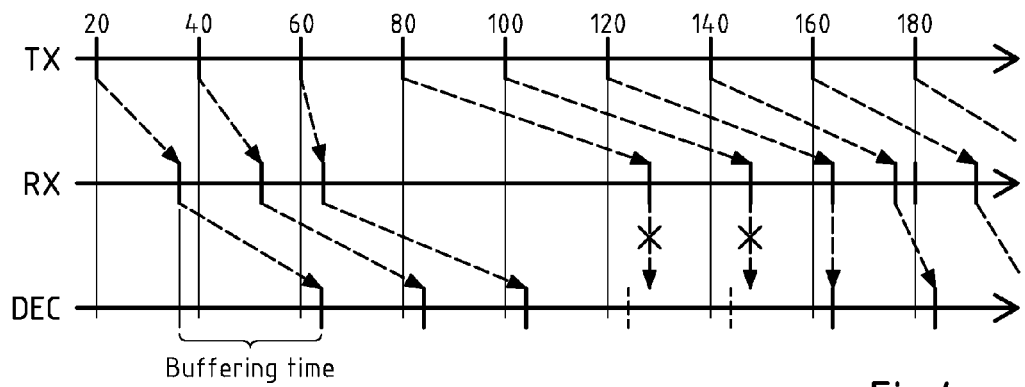
FIG. 4: an exemplary illustration of frame buffering according to a jitter buffer management scheme based on the number of frames in the buffer in case of an early arriving trigger frame.
Figure 12:
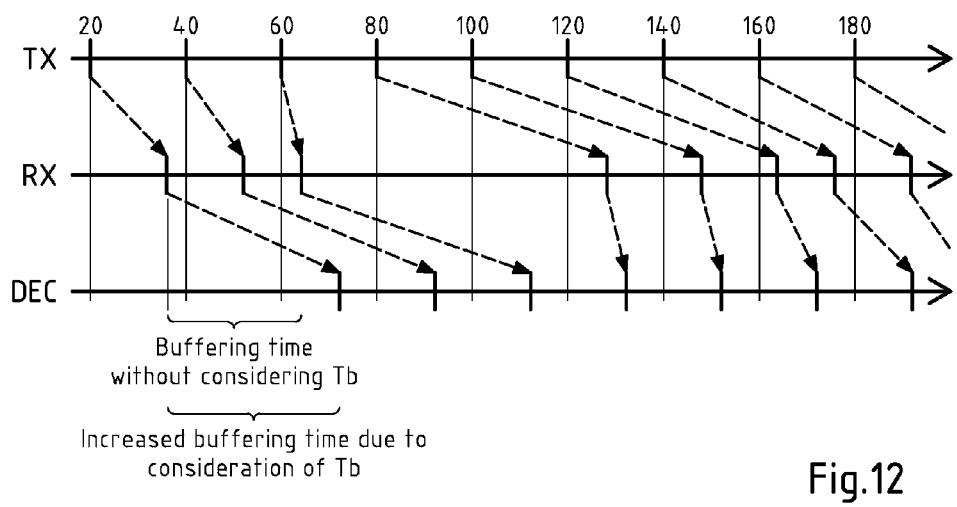
FIG. 12: an exemplary illustration of frame buffering according to the second exemplary embodiment of jitter buffer management according to the present invention in case of an early arriving trigger frame.

FIG. 12 illustrates the enhancement that is achieved by the second exemplary embodiment of the present invention in case of an early arriving trigger frame (compare to FIG. 4). As a result, the buffering time is increased when jitter buffer management jitter buffer management waits for the desired buffering time to elapse. Compared to FIG. 4, thus due to the additional consideration of the buffering time Tb and its comparison to Tr, the buffering time is increased and all frame losses can be avoided.

Figure 5:
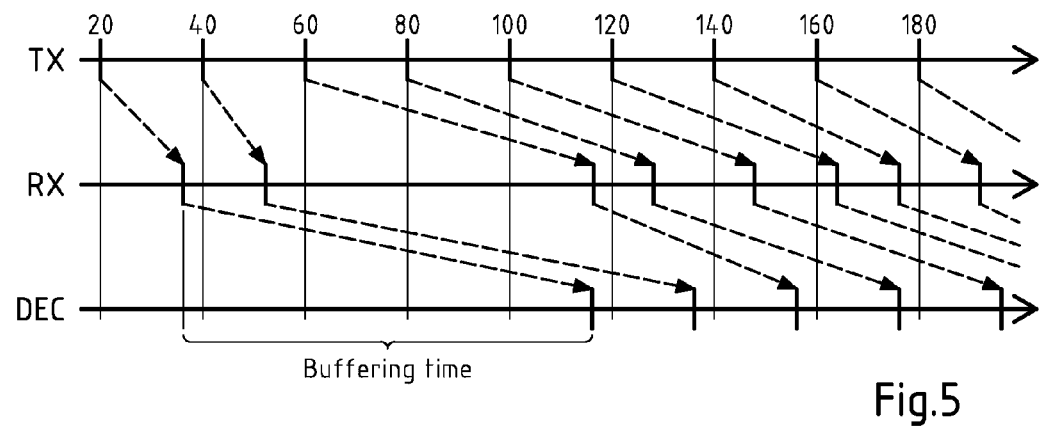
FIG. 5: an exemplary illustration of frame buffering according to a jitter buffer management scheme based on the number of frames in the buffer in case of a late arriving trigger frame.
Figure 13:
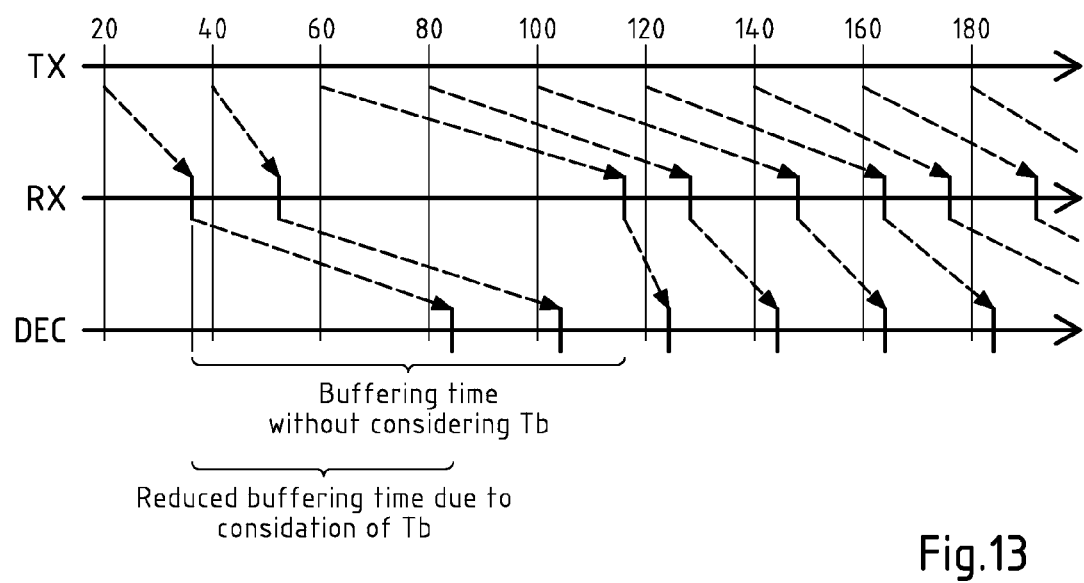
FIG. 13: an exemplary illustration of frame buffering according to the second exemplary embodiment of jitter buffer management according to the present invention in case of a late arriving trigger frame.

FIG. 13, on the other hand, presents the enhancement that is achieved by the second exemplary embodiment of the present invention in case of a late arriving trigger frame (compare to FIG. 5). Here, the buffering delay can be significantly reduced compared to FIG. 5 by additionally considering the buffering time Tb and comparing it to Tr.

The proposed embodiments of the present invention provide computationally simple mechanisms to improve the buffering performance (in terms of lower loss rate and/or shorter buffering delay), especially in challenging transmission conditions introducing large jitter and/or high numbers of lost packets.

The invention has been described above by means of exemplary embodiments. It should be noted that there are alternative ways and variations which are obvious to a skilled person in the art and can be implemented without deviating from the scope and spirit of the appended claims.

Furthermore, it is readily clear for a skilled person that the logical blocks in the schematic block diagrams as well as the flowchart and algorithm steps presented in the above description may at least partially be implemented in electronic hardware and/or computer software, wherein it depends on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors, application specific integrated circuits, field programmable gate arrays or other programmable devices. The computer software may be stored in a variety of storage media of electric, magnetic, electro-magnetic or optic type and may be read and executed by a processor, such as for instance a microprocessor. To this end, the processor and the storage medium may be coupled to interchange information, or the storage medium may be included in the processor.

What is claimed is:

1. A method, comprising:
   determining, in a processor, a buffering time for one or more frames received by a frame buffer based on a specific buffering time associated with an onset speech frame and on a time span covered by a number of frames contained in the frame buffer, wherein determining comprises:
   calculating, in a processor, an output point of time for said onset speech frame as the sum of a point of time at which said onset speech frame is received and said specific buffering time; and
   checking, in a processor, wherein said checking comprises:
   checking, if said output point of time has elapsed;
   checking, in case said output point of time has elapsed, if said time span is smaller than a first value that at least partially depends on said specific buffering time, increasing said output point of time and returning to said checking if said output point of time has elapsed in case said time span is smaller than said first value, and determining that said onset speech frame shall be output at a current point of time in case said time span is not smaller than said second value; and checking, in case said output point of time has not yet elapsed, if said time span is larger than a second value that at least partially depends on said specific buffering time, determining that said onset speech frame shall be output at a current point of time in case said time span is larger than said second value, and returning to said checking if said output point of time has elapsed in case said time span is not larger than said second value.

2. The method according to claim 1, wherein said specific buffering time is required buffering time of said onset speech frame.

3. The method according to claim 2, wherein said required buffering time is estimated.

4. The method according to claim 1, wherein said first value is said specific buffering time minus a first margin value.

5. The method according to claim 1, wherein said second value is said specific buffering time plus a second margin value.

6. The method according to claim 1, wherein said determining of said buffering time for said one or more frames is performed in a multimedia telephony service for internet protocol multimedia subsystem speech receiver.

7. The method according to claim 1, wherein said onset speech frame is a specific frame associated with said specific buffering time.

8. A method comprising:
  determining, in a processor, a buffering time for one or more frames received by a frame buffer based on a specific buffering time associated with an onset speech frame and on a number of frames contained in the frame buffer, wherein determining comprises:
  determining, in a processor, a target number of frames; and
  checking, in a processor, wherein said checking comprises:
  checking, if a number of frames in said frame buffer has reached said target number of frames;
  checking, in case said number of frames in said frame buffer has reached said target number of frames, if a time duration derived from said number of frames contained in said frame buffer is larger than a third value that at least partially depends on said specific buffering time, increasing said target number of frames and returning to said checking if a number of frames in said frame buffer has reached said target number of frames in case said time duration is larger than said third value, and determining that said onset speech frame shall be output at a current point of time in case said time duration is not larger than said third value; and
  checking, in case said number of frames in said frame buffer has not yet reached said target number of frames, if said time duration is smaller than a fourth value that at least partially depends on said specific buffering time, determining that said onset speech frame shall be output at a current point of time in case said time duration is smaller than said fourth value, and returning to said checking if a number of frames in said frame buffer has reached said target number of frames in case said time duration is not smaller than said fourth value.

9. The method according to claim 8, wherein said specific buffering time is a time elapsed since said onset speech frame has been received.

10. The method according to claim 8, wherein said third value is said specific buffering time plus a third margin value.

11. The method according to claim 8, wherein said fourth value is said specific buffering time minus a fourth margin value.

12. A computer program product comprising a non-transitory computer readable medium bearing computer program code embodied therein for use with a computer, the computer program code comprising:
  instructions operable to cause a processor to determine a buffering time for one or more frames received by a frame buffer based on a specific buffering time associated with an onset speech frame and on a time span covered by a number of frames contained in the frame buffer, wherein the instructions operable to cause the determining comprises:
  calculating an output point of time for said onset speech frame as the sum of a point of time at which said onset speech frame is received and said specific buffering time; and
  checking if said output point of time has elapsed;
  checking in case said output point of time has elapsed, if said time span is smaller than a first value that at least partially depends on said specific buffering time, increasing said output point of time and returning to said checking if said output point of time has elapsed in case said time span is smaller than said first value, and determining that said onset speech frame shall be output at a current point of time in case said time span is not smaller than said second value; and
  checking, in a processor in case said output point of time has not yet elapsed, if said time span is larger than a second value that at least partially depends on said specific buffering time, determining that said onset speech frame shall be output at a current point of time in case said time span is larger than said second value, and returning to said checking if said output point of time has elapsed in case said time span is not larger than said second value.

13. The computer-readable medium according to claim 12, wherein said onset speech frame is a specific frame associated with said specific buffering time.

14. An apparatus, comprising:
  at least one processor and at least one memory including computer program code, the at least one memory and the computer program code configured to, with the at least one processor, cause the apparatus at least to:
  determine a buffering time for one or more frames received by a frame buffer based on a specific buffering time associated with a onset speech frame and on a time span covered by a number of frames contained in the frame buffer, wherein the at least one memory and the computer code are further configured to cause the apparatus at least to determine is further configured to cause the apparatus at least to:
  calculate an output point of time for said onset speech frame as the sum of a point of time at which said onset speech frame is received and said specific buffering time;
  check, if said output point of time has elapsed;
  check in case said output point of time has elapsed, if said time span is smaller than a first value that at least partially depends on said specific buffering time, increasing said output point of time and returning to said checking if said output point of time has elapsed in case said time span is smaller than said first value, and determining that said onset speech frame shall be output at a current point of time in case said time span is not smaller than said second value; and check, in a processor in case said output point of time has not yet elapsed, if said time span is larger than a second value that at least partially depends on said specific buffering time, determining that said onset speech frame shall be output at a current point of time in case said time span is larger than said second value, and returning to said checking if said output point of time has elapsed in case said time span is not larger than said second value.

15. The apparatus according to claim 14, wherein said apparatus is embodied as a module.

16. The apparatus according to claim 14, wherein said apparatus is one of a multimedia telephony service for internet protocol multimedia subsystem speech receiver and a part of such a receiver.

17. An apparatus comprising:
at least one processor and at least one memory including computer program code, the at least one memory and the computer program code configured to, with the at least one processor, cause the apparatus at least to:
determine a buffering time for one or more frames received by a frame buffer based on a specific buffering time associated with a onset speech frame and on a number of frames contained in the frame buffer, wherein the at least one memory and the computer program code configured to, with the at least one processor, cause the apparatus at least to determine is further configured to cause the apparatus at least to:
determine a target number of frames; and
check, if a number of frames in said frame buffer has reached said target number of frames;
check, in case said number of frames in said frame buffer has reached said target number of frames, if a time duration derived from said number of frames contained in said frame buffer is larger than a third value that at least partially depends on said specific buffering time, increase said target number of frames and return to said checking if a number of frames in said frame buffer has reached said target number of frames in case said time duration is larger than said third value, and determine that said onset speech frame shall be output at a current point of time in case said time duration is not larger than said third value;
check, in case said number of frames in said frame buffer has not yet reached said target number of frames, if said time duration is smaller than a fourth value that at least partially depends on said specific buffering time, determine that said onset speech frame shall be output at a current point of time in case said time duration is smaller than said fourth value, and return to said checking if a number of frames in said frame buffer has reached said target number of frames in case said time duration is not smaller than said fourth value, wherein the onset speech frame is the first frame of a talk spurt region.

18. The apparatus according to claim 17, wherein said apparatus is one of a multimedia telephony service for internet protocol multimedia subsystem speech receiver and a part of such a speech receiver.

19. The apparatus according to claim 17, wherein said onset speech frame is a specific frame associated with said specific buffering time.

* * * * *